United States Patent
Lecue et al.

(10) Patent No.: US 10,909,494 B2
(45) Date of Patent: Feb. 2, 2021

(54) SYSTEM FOR COLLABORATIVE LOGISTICS USING A COLLABORATIVE LOGISTICS MAP AND A KNOWLEDGE GRAPH

(71) Applicant: Accenture Global Solutions Limited, Dublin (IE)

(72) Inventors: Freddy Lecue, Castleknock (IE); Chahrazed Bouhini, Dublin (IE); Nut Limsopatham, Dublin (IE)

(73) Assignee: Accenture Global Solutions Limited, Dublin (IE)

( * ) Notice: Subject to any disclaimer, the term of this patent is extended or adjusted under 35 U.S.C. 154(b) by 228 days.

(21) Appl. No.: 15/937,219

(22) Filed: Mar. 27, 2018

(65) Prior Publication Data

US 2019/0303857 A1    Oct. 3, 2019

(51) Int. Cl.

| | |
|---|---|
| *G06Q 10/00* | (2012.01) |
| *G06F 16/00* | (2019.01) |
| *G06N 3/00* | (2006.01) |
| *G06Q 10/08* | (2012.01) |
| *G06Q 10/10* | (2012.01) |
| *G06F 16/29* | (2019.01) |
| *G06N 3/08* | (2006.01) |

(52) U.S. Cl.
CPC ......... *G06Q 10/0834* (2013.01); *G06F 16/29* (2019.01); *G06Q 10/08355* (2013.01); *G06Q 10/1097* (2013.01); *G06N 3/08* (2013.01); *G06Q 10/0838* (2013.01)

(58) Field of Classification Search
CPC ........ G06Q 10/00–50/00; G06F 16/29; G06N 3/08
USPC .............................................. 705/7.11–7.42
See application file for complete search history.

(56) References Cited

U.S. PATENT DOCUMENTS

| | | | | |
|---|---|---|---|---|
| 2008/0077464 | A1* | 3/2008 | Gottlieb | G06Q 10/08 705/28 |
| 2015/0073929 | A1* | 3/2015 | Psota | G06Q 50/28 705/26.2 |
| 2016/0063435 | A1* | 3/2016 | Shah | G06Q 10/0833 705/44 |
| 2017/0219373 | A1* | 8/2017 | DiMeo | G01C 21/3667 |
| 2019/0049988 | A1* | 2/2019 | Meij | G06Q 10/083 |
| 2019/0114564 | A1* | 4/2019 | Ferguson | G06Q 10/06312 |
| 2019/0155961 | A1* | 5/2019 | Alonso | G06F 16/284 |
| 2019/0220819 | A1* | 7/2019 | Banvait | B64C 39/024 |

\* cited by examiner

*Primary Examiner* — Alan S Miller
*Assistant Examiner* — Mustafa Iqbal
(74) *Attorney, Agent, or Firm* — Harrity & Harrity, LLP

(57) ABSTRACT

A device may generate a product delivery map that includes route information that is to be used by a fleet of delivery vehicles for performing a set of deliveries, and a set of location constraints identifying locations that are to be avoided by the fleet of delivery vehicles when performing the set of deliveries. The device may generate a collaborative interactions map that includes a set of collaborative constraints indicating particular supplier organizations that are candidates to engage in collaborative logistics. The device may determine, based on the set of location constraints and the set of collaborative constraints, a set of delivery schedules that are to be used to perform the set of deliveries. The device may provide the set of delivery schedules to one or more devices associated with the delivery organization to allow the fleet of delivery vehicles to perform the set of deliveries.

20 Claims, 8 Drawing Sheets

SYSTEM FOR COLLABORATIVE LOGISTICS USING A COLLABORATIVE LOGISTICS MAP AND A KNOWLEDGE GRAPH

BACKGROUND

Collaborative logistics may refer to one or more processes whereby a group of supplier organizations use the same delivery organization (and often the same delivery vehicle) to deliver goods of the group of supplier organizations to various destination locations.

SUMMARY

According to some possible implementations, a device may include one or more memories and one or more processors that are communicatively coupled with the one or more memories. The one or more processors may generate a product delivery map that includes route information that is to be used by a fleet of delivery vehicles for performing a set of deliveries, and a set of location constraints identifying locations that are to be avoided by the fleet of delivery vehicles when performing the set of deliveries. The set of deliveries may be for delivering a set of products that are associated with a plurality of supplier organizations. The fleet of delivery vehicles may be associated with a delivery organization. The one or more processors may generate a collaborative interactions map that includes a set of collaborative constraints indicating particular supplier organizations of the plurality of supplier organizations that are candidates to engage in collaborative logistics. The one or more processors may generate a collaborative logistics map that includes the set of location constraints, the set of collaborative constraints, and a set of product constraints associated with a knowledge graph. The set of product constraints may include one or more constraints that identify which products, of the set of products, are unable to be transported together in a particular delivery vehicle of the fleet of delivery vehicles. The one or more processors may determine, for the collaborative logistics map, a set of delivery schedules that are to be used to perform the set of deliveries. The set of delivery schedules may be determined based on the set of location constraints, the set of collaborative constraints, and the set of product constraints. The one or more processors may provide the set of delivery schedules to one or more devices associated with the delivery organization to allow the fleet of delivery vehicles to perform the set of deliveries.

According to some possible implementations, a method may include generating, by a device, a product delivery map that includes route information that is to be used by a fleet of delivery vehicles for performing a set of deliveries and a set of location constraints identifying locations that are to be avoided by the fleet of delivery vehicles when performing the set of deliveries. The set of deliveries may be for delivering a set of products that are associated with a plurality of supplier organizations, and the fleet of delivery vehicles may be associated with a delivery organization. The method may include generating, by the device, a collaborative logistics map that includes the set of location constraints and a set of product constraints associated with a data structure. The set of product constraints may include one or more constraints that identify which products, of the set of products, are unable to be transported together in a particular delivery vehicle of the fleet of delivery vehicles. The method may include determining, by the device and for the collaborative logistics map, a set of delivery schedules that are to be used to perform the set of deliveries. The set of delivery schedules may be determined based on the set of location constraints and the set of product constraints. The method may include providing, by the device, the set of delivery schedules to one or more devices associated with the delivery organization to allow the fleet of delivery vehicles to perform the set of deliveries.

According to some possible implementations, a non-transitory computer-readable medium may store one or more instructions that, when executed by one or more processors, cause the one or more processors to generate a product delivery map that includes route information that is to be used by a fleet of delivery vehicles for performing a set of deliveries, and a set of location constraints identifying locations that are to be avoided by the fleet of delivery vehicles when performing the set of deliveries. The set of deliveries may be for delivering a set of products that are associated with a plurality of supplier organizations, and the fleet of delivery vehicles may be associated with a delivery organization. The one or more instructions may cause the one or more processors to generate a collaborative interactions map that includes a set of collaborative constraints indicating particular supplier organizations of the plurality of supplier organizations that are candidates to engage in collaborative logistics. The one or more instructions may cause the one or more processors to determine a set of delivery schedules that are to be used to perform the set of deliveries. The set of delivery schedules may be determined based on the set of location constraints and the set of collaborative constraints. The one or more instructions may cause the one or more processors to provide the set of delivery schedules to one or more devices associated with the delivery organization to allow the fleet of delivery vehicles to perform the set of deliveries.

DETAILED DESCRIPTION

Figure 1A:
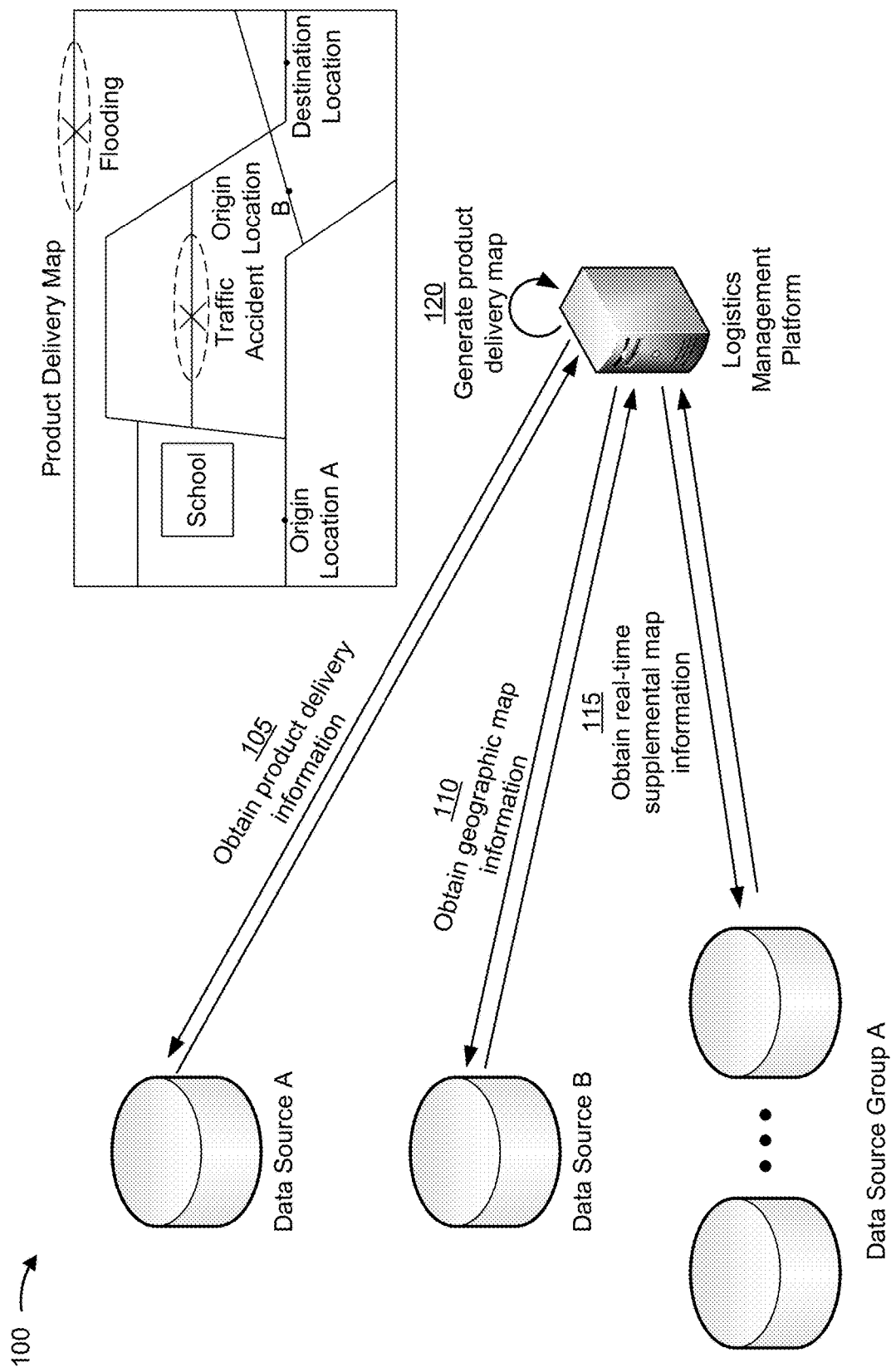
FIGS. 1A-1D are diagrams of an overview of an example implementation described herein.

The following detailed description of example implementations refers to the accompanying drawings. The same reference numbers in different drawings may identify the same or similar elements.

Two (or more) supplier organizations may engage in collaborative logistics by using a fleet of delivery vehicles of a delivery organization to perform deliveries for the supplier organizations. For example, a vehicle of the delivery organization may transport goods of a supplier organization and goods of another supplier organization, which may reduce logistics cost by reducing a number of vehicles that each organization has to pay for, by reducing a number of delivery vehicles that perform deliveries at less than full capacity, and/or the like.

However, collaboration between two or more supplier organizations may be difficult as a result of constraints that prevent the two or more supplier organizations from transporting goods with the same fleet of delivery vehicles, constraints related to the delivery routes conditions, and/or the like. For example, a product of a first supplier organization and a product of a second supplier organization may be unable to be transported together based on a location constraint (e.g., an origin location of each good is too far apart, a weather-related or traffic-related constraint that prevents a particular route which is required by one of the supplier organizations, etc.), a collaborative constraint (e.g., the first supplier organization and second supplier organizations have a conflict of delivery routes/paths, 'conflict of interest, have indicated a desire not to do business together, have conflicting transportation budgets', etc.), a product constraint (e.g., two products may be incompatible in the same delivery vehicle due to rules and regulations regarding transportation of goods), and/or the like.

Some implementations described herein provide a logistics management platform to generate a collaborative logistics map that allows multiple supplier organizations to collaborate with a delivery organization, such that products of the multiple supplier organizations may be transported together using the same delivery vehicles of the delivery organization. For example, the logistics management platform may generate a product delivery map that includes route information that is to be used by a fleet of delivery vehicles for performing a set of deliveries and a set of location constraints identifying locations that are to be avoided by the fleet of delivery vehicles when performing the set of deliveries. The set of deliveries may be for delivering a set of products that are associated with multiple supplier organizations, and the fleet of delivery vehicles may be associated with a delivery organization. Furthermore, the logistics management platform may generate a collaborative interactions map that includes a set of collaborative constraints indicating particular supplier organizations of the multiple supplier organizations that are candidates to engage in collaborative logistics.

Additionally, the logistics management platform may generate a collaborative logistics map using the set of product constraints, the set of collaborative constraints, and a set of product constraints associated with a knowledge graph. The set of product constraints may include one or more constraints that identify which products, of the set of products, are unable to be transported together in a particular delivery vehicle of the fleet of delivery vehicles. Next, the logistics management platform may determine a set of delivery schedules that are to be used to perform the set of deliveries, such that the delivery schedules do not interfere with the set of location constraints, the set of collaborative constraints, and the set of product constraints Furthermore, the logistics management platform may provide the set of delivery schedules to one or more devices associated with the delivery organization to allow the fleet of delivery vehicles to perform the set of deliveries.

In this way, the logistics management platform allows the multiple supplier organizations to reduce transportation cost by scheduling efficient deliveries. Furthermore, the logistics management platform conserves processing resources by reducing a total number of deliveries that need to be processed, conserves processing resources relative to an inferior platform that is unable to generate delivery schedules in a manner that does not interfere with the constraints described above, conserves processing resources that might otherwise be used to generate new delivery schedules if an original delivery schedule includes routes that are unavailable, and/or the like.

FIGS. 1A-1D are diagrams of an overview of an example implementation 100 described herein. As shown in FIGS. 1A-1D, example implementation 100 may include a logistics management platform that generates a collaborative logistics map with a set of delivery schedules that are to be used by a fleet of delivery vehicles for delivering products associated with multiple supplier organizations. For example, the logistics management platform may generate a product delivery map (see, e.g., FIG. 1A) and a collaborative interactions map (see, e.g., FIG. 1B), and may use the product delivery map, the collaborative interactions map, and a knowledge graph (see, e.g., FIG. 1C) to generate the collaborative logistics map (e.g., see, FIG. 1D), as described in detail herein.

As shown in FIG. 1A, and by reference number 105, the logistics management platform may obtain product delivery information from a first data source (shown as data source A). The product delivery information may include, for each product provided by a supplier organization, a product name, a product pickup location, a product delivery location, a product delivery date, a product delivery time or time range, route information for a product that identifies a path from an origin location to a destination location, and/or the like.

As shown by reference number 110, the logistics management platform may obtain geographic map information from a second data source (shown as data source B). The geographic map information may include information relating to a road (e.g., sets of geographic coordinates identifying a length and/or width of a road, a quantity of lanes in the road, the direction or directions of travel permitted on the road, a speed limit of the road, data (e.g., shapes) identifying a road with a skewed shape, such as a flooded road, a non-flat flat, and/or the like, etc.), in addition to a man-made structure around the road (e.g., sets of geographic coordinates for a building, such as a store, a school, etc.), a natural structure around the road (e.g., sets of geographic coordinates identifying a body of water, a mountain, etc.), and/or the like.

As shown by reference number 115, the logistics management platform may obtain real-time supplemental map information from a first group of data sources (shown as data source group A). The real-time supplemental map information may include information obtained from satellites (e.g., satellite images), information obtained from servers (e.g., real-time weather information, forecasted weather information, real-time traffic information, and/or the like), information obtained from sensors affixed to delivery vehicles, information obtained from sensors associated with user devices in delivery vehicles, information obtained from sensors located at particular geographic locations (e.g., a sensor at an intersection), and/or the like. For example, the real-time supplemental map information may include weather information (e.g., rain may have caused a road to flood), information missing from the geographic map information (e.g., a new building, a new road, a new traffic light, etc.), traffic information (e.g., traffic congestion, a road block, etc.), delivery vehicle information (e.g., a current location of a delivery vehicle, a status of a delivery vehicle, such as a status indicating an amount of fuel, an operating state, an occurrence of a maintenance light, etc.), and/or the like.

As shown by reference number 120, the logistics management platform may generate a product delivery map. For example, the logistics management platform may generate a product delivery map using the product delivery information, the geographic map information, and the real-time supplemental map information. In this case, the product delivery map may include the route information that is to be used by a fleet of delivery vehicles for performing a set of deliveries. Additionally, the product delivery map may include a set of location constraints identifying locations that are to be avoided by the fleet of delivery vehicles when performing the set of deliveries. For example, the set of location constraints, which may be based on the real-time supplemental map information, may identify events or incidents at particular locations that might inhibit or prevent a particular route from being used as an optimal route for delivery of a product to a destination location, such as a traffic jam, a flood, a road closure, and/or the like.

As shown as an example, the product delivery map may include a first location constraint in a particular location that identifies a flood and may include a second location constraint in another location that identifies a traffic accident.

In this way, the logistics management platform is able to generate a product delivery map that includes a set of location constraints that may be considered when determining routes for performing the set of deliveries, as described herein.

Figure 1B:
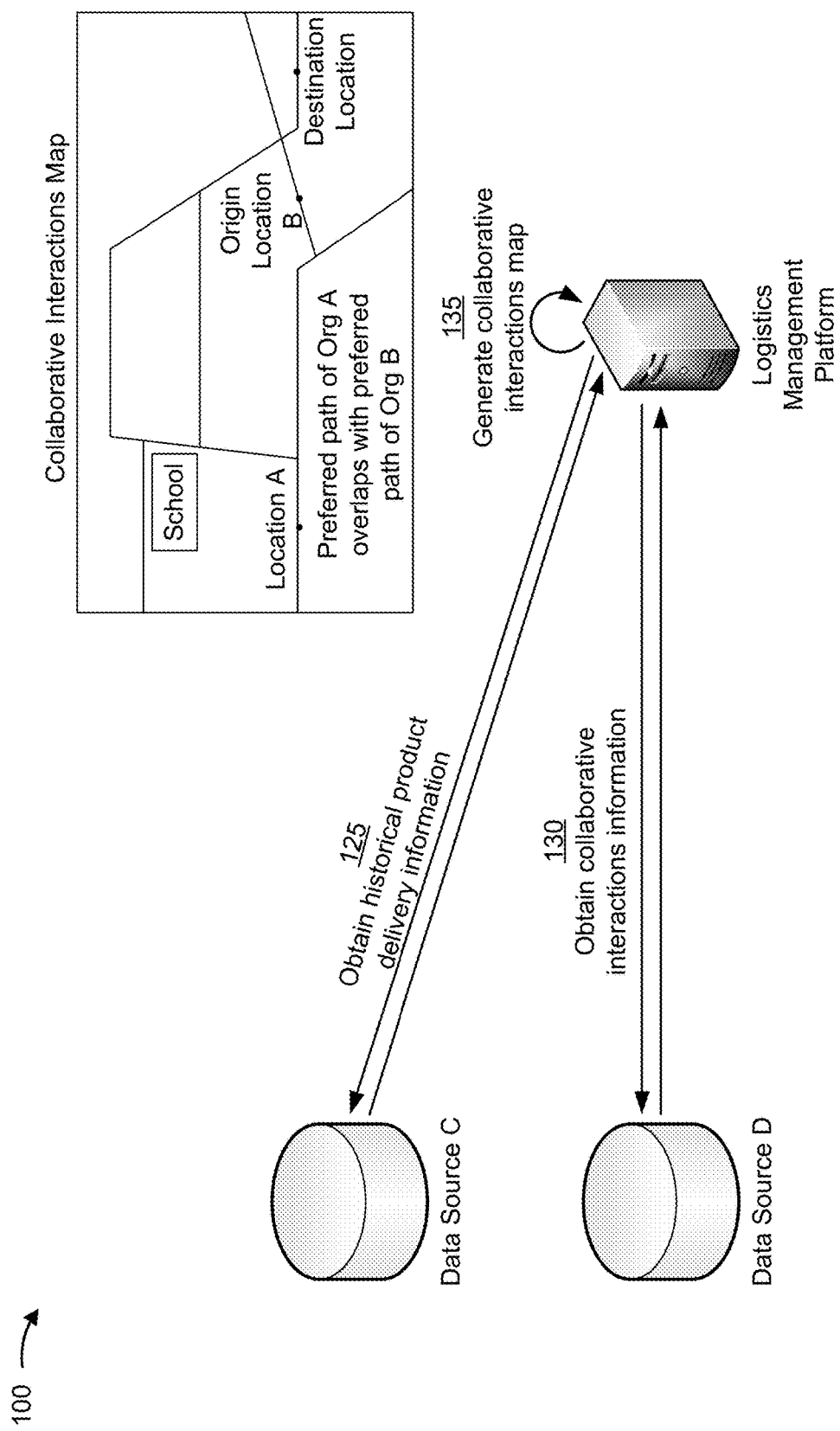

As shown in FIG. 1B, and by reference number 125, the logistics management platform may obtain historical product delivery information from a fourth data source (shown as data source C). The historical product delivery information may include historical information for each product provided by a supplier organization, such as a product name, a product destination, a product delivery date, a product delivery time or time range, route information identifying a path from an origin location to a destination location, and/or the like.

As shown by reference number 130, logistics management platform may obtain collaborative interactions information from a fifth data source (shown as data source D). The collaborative interactions information may include information identifying a particular delivery organization that is used by multiple supplier organizations, information identifying a preferred delivery organization of a particular supplier organization, information identifying a delivery organization that satisfies a threshold level of popularity, information identifying a delivery organization that is often used to deliver a particular type of good, information identifying supplier organizations with budgets within a threshold range of each other, and/or the like.

As shown reference number 135, the logistics management platform may generate a collaborative interactions map that includes a set of collaborative constraints. For example, the logistics management platform may use the historical product delivery information and the collaborative interactions information to generate a collaborative interactions map that includes a set of collaborative constraints. The set of collaborative constraints may identify groups of supplier organizations that are candidates to engage in collaborative logistics.

As shown as an example, the logistics management platform may determine that supplier organization A and supplier organization B are candidates to engage in collaborative logistics as a result of a shared delivery path. For example, the collaborative interactions information may identify a preferred delivery path for a good of supplier organization A and a preferred delivery path for a good of supplier organization B. In this case, the collaborative interactions map may include one or more collaborative constraints, and, if there are no constraints between supplier organization A and supplier organization B, then the good of supplier organization A and the good of supplier organization B are able to be transported together as a result of an overlapping preferred delivery path. For example, a fastest-available route from location A (e.g., a pickup point for supplier organization A's goods) to a destination location travels through origin location B (e.g., a pickup point for supplier organization B's goods), thereby making the goods a suitable match for sharing a particular delivery vehicle.

In some implementations, the logistics management platform may generate the collaborative interactions map using a social network analysis (SNA) technique. For example, the logistics management platform may use an SNA technique to process the historical product delivery information and/or the collaborative interactions information for the one or more supplier organizations. In this case, the SNA technique may process the historical product delivery information and/or the collaborative interactions information to identify relationships between particular supplier organizations that identify things that supplier organizations have in common, such as products, location, commonly used delivery routes, how often two supplier organizations collaborate with each other, a relationship between supplier organizations (e.g., are two organizations sister companies, engaged in a partnership, work together frequently, etc.), and/or the like.

In this way, the logistics management platform is able to generate a collaborative interactions map that includes a set of collaborative constraints that identify which supplier organizations and/or which products may or may not be suitable for collaboration.

Figure 1C:
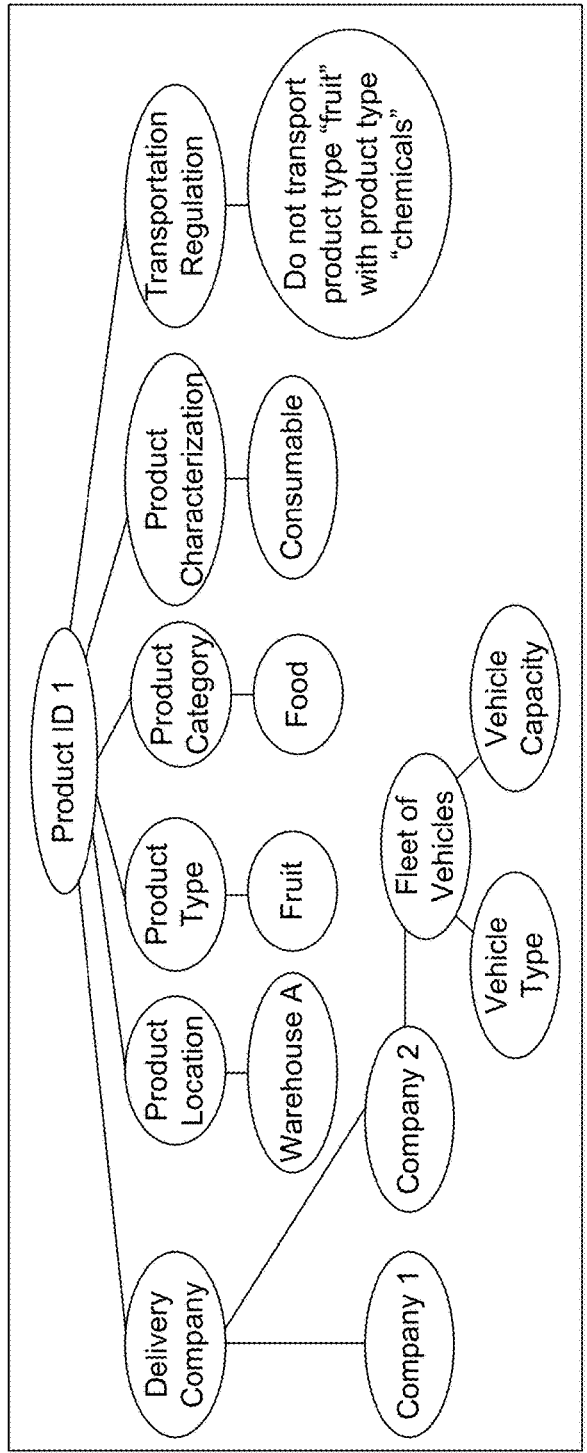

As shown in FIG. 1C, and by reference number 140, the logistics management platform may obtain a set of product constraints from a knowledge graph. For example, logistics management platform 230 may access a knowledge graph that includes a set of nodes identifying product information for the set of products and a set of edges that identify relationships between the nodes. Additionally, the knowledge graph may include hundreds of thousands, millions, or more, of nodes and/or edges that include product information associated with multiple supplier organizations.

The knowledge graph may include a node identifying a product type (e.g., a television, a fruit, a chemical, etc.), a node identifying a product category (e.g., an electronic good, a food, etc.), a node identifying a product characterization (e.g., a hazardous product, a fragile product, a robust product, etc.), a product location (e.g., coordinates of a warehouse, coordinates of a store, etc.), a node identifying a delivery organization used to deliver a particular product, a node identifying delivery vehicle information for the fleet of vehicles associated with the delivery organization, such as a vehicle type (e.g., a semi-truck trailer, a truck with refrigeration capabilities, an armored vehicle, etc.) and/or a vehicle capacity, a node identifying a rule or a regulation associated with transportation of a particular product, such as a node identifying whether a first product and a second product have a constraint that prevents the two products from being transported together in a particular path (road) or in a particular delivery vehicle (e.g., if a first product is a chemical and a second product is a food, etc.), or a node identifying a geographic area in which a particular product may not be transported (e.g., a chemical in a threshold distance of a school), and/or the like.

In this way, the logistics management platform is able to obtain a set of product constraints that may be used to generate a collaborative logistics map, as described further herein.

Figure 1D:
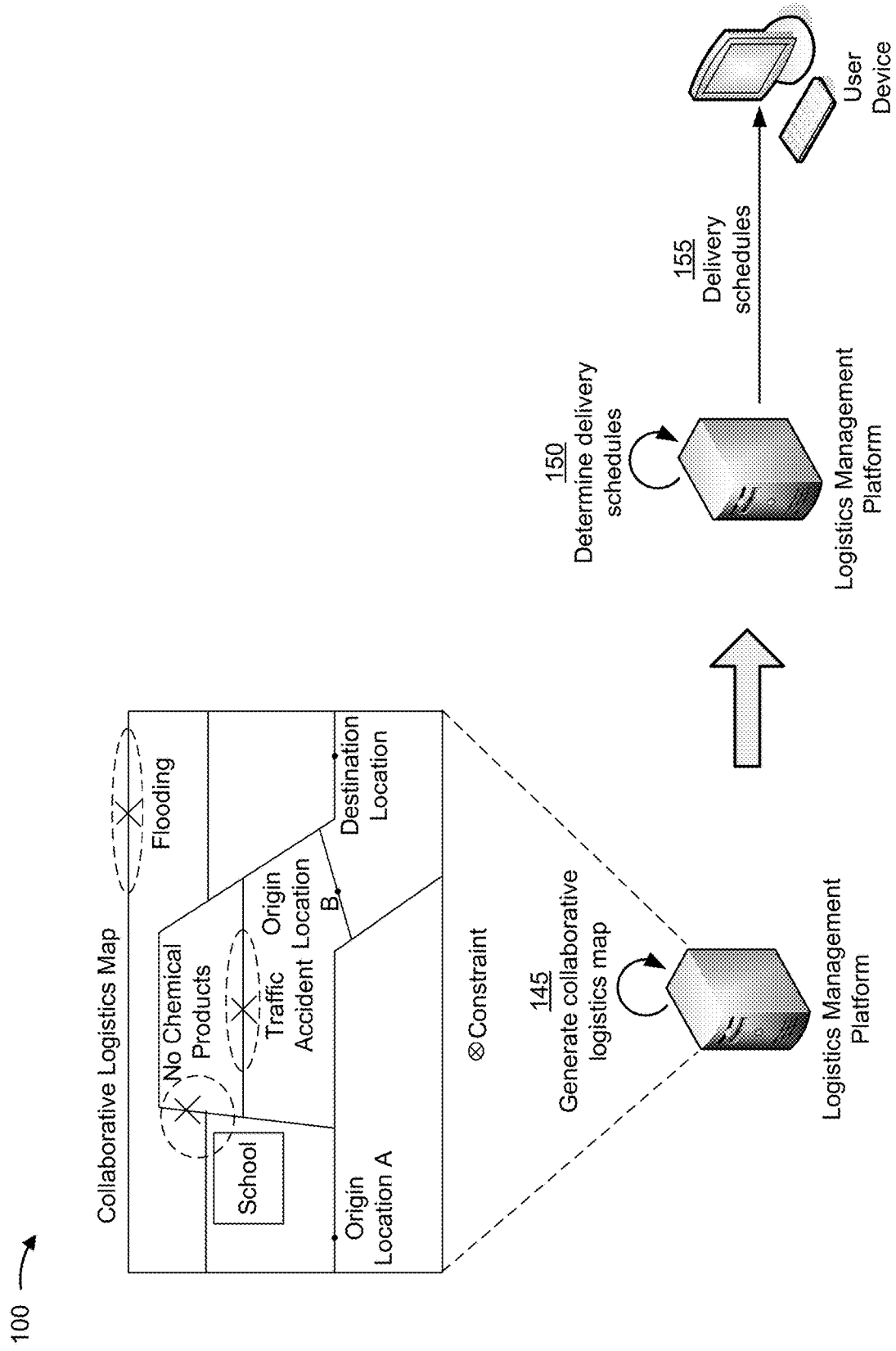

As shown by in FIG. 1D, and by reference number 145, the logistics management platform may generate a collaborative logistics map. For example, the logistics management platform may generate a collaborative logistics map that includes the set of location constraints, the set of collaborative constraints, and the set of product constraints. As shown as an example, the collaborative logistics map may include a first location constraint identifying a flood, a second location constraint identifying a traffic accident, a first collaborative constraint indicating that goods of organization A and goods of organization B share a preferred delivery path, and a first product constraint indicating that chemical products may not be transported through a particular location (e.g., due to being in close proximity of a school).

As shown by reference number 150, the logistics management platform may use the collaborative logistics map to determine a set of delivery schedules. For example, the logistics management platform may determine a set of delivery schedules by determining final product placement for the set of products and by determining a set of routes to be traversed by the fleet of delivery vehicles. In this case, the logistics management platform may use the set of location constraints, the set of collaborative constraints, and/or the set of product constraints to determine the final product placement for the set of products (e.g., by identifying which products may be assigned to particular delivery vehicles).

Additionally, the logistics management platform may determine the set of routes by identifying routes that do not interfere with the set of location constraints, the set of collaborative constraints, and/or the set of product constraints. As an example, the logistics management platform may determine a route that allows a delivery vehicle to deliver goods of organization A and goods of organization B to the destination location, where the route does not interfere with location constraints associated with the traffic accident or the flood, and that does not interfere with a product constraint associated with not allowing chemicals to be transported near a school (e.g., the route may be the bottom most road shown on the collaborative logistics map).

As shown by reference number 155, the logistics management platform may provide the set of delivery schedules to a user device. For example, the logistics management platform may provide the set of delivery schedules to the user device such that the delivery organization is able to use the set of delivery schedules to instruct the fleet of vehicles to perform the set of deliveries. Additionally, or alternatively, the logistics management platform may provide the information indicating the final product placement of the set of goods to a robot (e.g., located at a store or a warehouse), such that the robot is able to use the information to load particular products onto particular delivery vehicles, as described in detail further herein. Additionally, or alternatively, the logistics management platform may provide the set of routes to one or more autonomous vehicles and/or drones capable of automatically performing the set of deliveries, as described in detail further herein.

In this way, multiple supplier organizations are able to collaborate despite the set of location constraints, the set of collaborative constraints, and the set of product constraints, thereby reducing transportation cost of the multiple supplier organizations. Furthermore, the logistics management platform conserves processing resources processing resources by reducing a total number of deliveries that need to be scheduled and processed (e.g., by sharing deliveries with other companies, by delegating deliveries to the other companies, etc.).

As indicated above, FIGS. 1A-1D are provided merely as an example. Other examples are possible and may differ from what was described with regard to FIGS. 1A-1D. For example, there can be additional devices and/or networks, fewer devices and/or networks, different devices and/or networks, or differently arranged devices and/or networks than those shown in FIGS. 1A-1D. Furthermore, two or more devices shown in FIGS. 1A-1D can be implemented within a single device, or a single device shown in FIGS. 1A-1D can be implemented as multiple, distributed devices. Additionally, or alternatively, a set of devices (e.g., one or more devices) of example implementation 100 can perform one or more functions described as being performed by another set of devices of example implementation 100.

Figure 2:
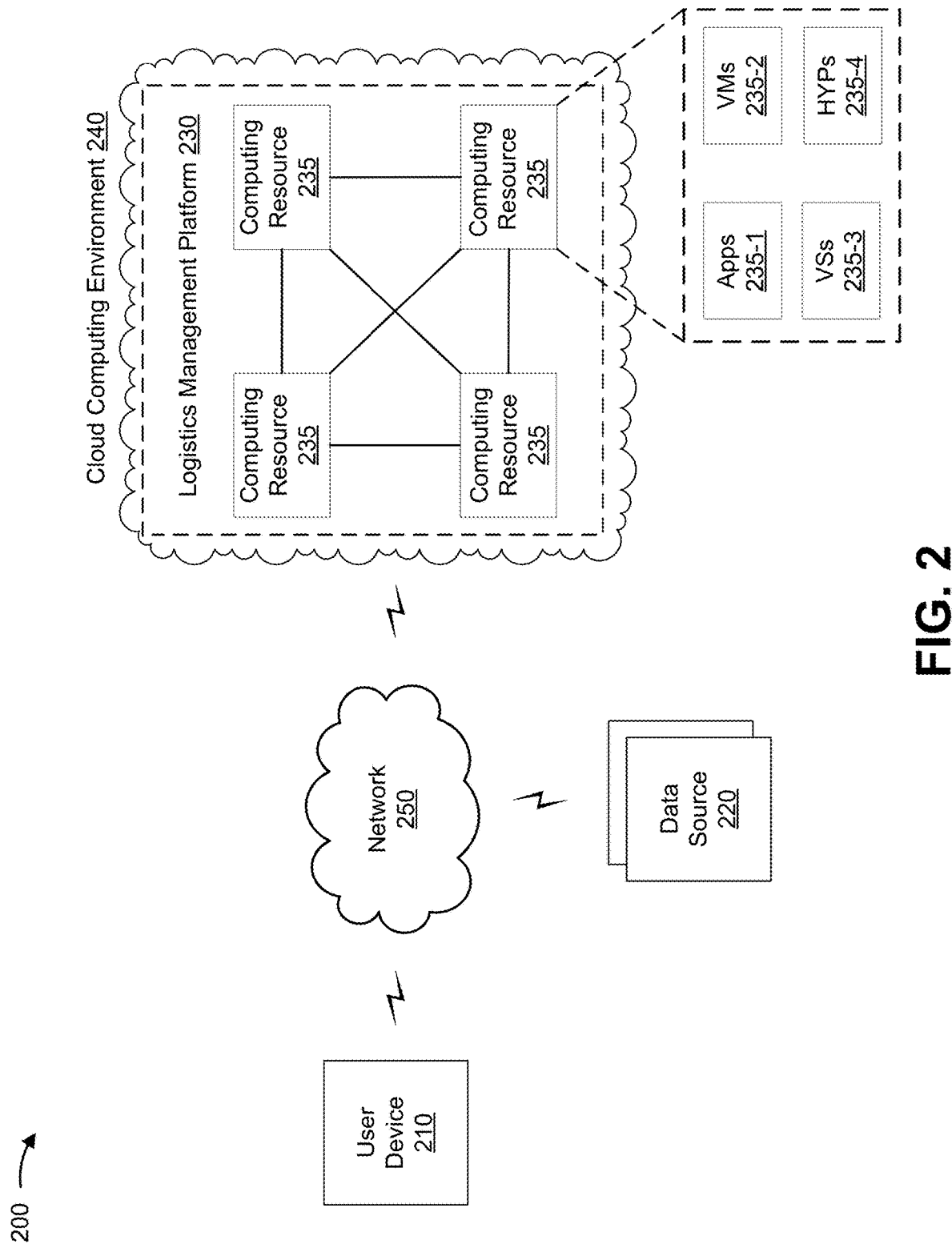
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, example environment 200 may include a user device 210, a data source 220, a logistics management platform 230 hosted by a cloud computing environment 240, and/or a network 250. Devices of example environment 200 may interconnect via wired connections, wireless connections, or a combination of connections.

User device 210 includes one or more devices capable of receiving, generating, storing, processing, and/or providing information associated with a set of delivery schedules. For example, user device 210 may include a communication and/or computing device, such as a phone (e.g., a mobile phone, such as a smartphone, a radiotelephone, etc.), a laptop computer, a tablet computer, a handheld computer, a gaming device, a wearable communication device (e.g., a smart wristwatch, a pair of smart eyeglasses, etc.), a global positioning system (GPS) device, an electronic control unit (ECU) of a vehicle, an engine control module (ECM) of a delivery vehicle, or a similar type of device. In some implementations, user device 210 may receive, from logistics management platform 230, a set of delivery schedules that are to be used to perform a set of deliveries.

Data source 220 includes one or more devices capable of receiving, storing, processing, and/or providing information that may be used for determining a set of delivery schedules. For example, data source 220 may include a server device, a group of server devices, a sensor, such as, for example, a camera, a sensor located near a particular intersection or portion of a road, a vehicle sensor, a sensor affixed to a drone, a sensor capable of detecting weight or vehicle length, a pneumatic tube counting device, a sensor capable of performing weather readings, a sensor capable of reading vehicle status information (e.g., a tire pressure reading, a reading identifying an amount of available fuel, a reading identifying whether a check engine light is on, etc.), and/or the like.

In some implementations, data source 220 may store product delivery information, geographic map information, real-time supplemental map information, historical product delivery information, collaborative interactions information, and/or other types of information that may aid logistics management platform 230 in scheduling deliveries to destinations, using vehicles owned by delivery companies. In some or more of the above implementations, information may be provided from a data source 220 to logistics management platform 230.

Logistics management platform 230 includes one or more devices capable of receiving, storing, generating, processing, and/or providing information associated with collaborative logistics map. For example, logistics management platform 230 may include a server device (e.g., a host server, a web server, an application server, etc.), a data center device, or a similar device.

In some implementations, as shown, logistics management platform 230 may be hosted in cloud computing environment 240. Notably, while implementations described herein describe logistics management platform 230 as being hosted in cloud computing environment 240, in some implementations, logistics management platform 230 might not be cloud-based (i.e., may be implemented outside of a cloud computing environment) or might be partially cloud-based.

Cloud computing environment 240 includes an environment that hosts logistics management platform 230. Cloud computing environment 240 may provide computation, software, data access, storage, and/or other services that do not require end-user knowledge of a physical location and configuration of system(s) and/or device(s) that host logistics management platform 230. As shown, cloud computing environment 240 may include a group of computing resource 235 (referred to collectively as "computing resources 235 and individually as "computing resource 235").

Computing resource 235 includes one or more personal computers, workstation computers, server devices, or another type of computation and/or communication device. In some implementations, computing resource 235 may host logistics management platform 230. The cloud resources may include compute instances executing in computing resource 235, storage devices provided in computing resource 235, data transfer devices provided by computing resource 235, etc. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, or the like.

Application 235-1 includes one or more software applications that may be provided to or accessed by user device 210. Application 235-1 may eliminate a need to install and execute the software applications on user device 210. For example, application 235-1 may include software associated with logistics management platform 230 and/or any other software capable of being provided via cloud computing environment 240. In some implementations, one application 235-1 may send/receive information to/from one or more other applications 235-1, via virtual machine 235-2.

Virtual machine 235-2 includes a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program, and may support a single process. In some implementations, virtual machine 235-2 may execute on behalf of a user (e.g., user device 210), and may manage infrastructure of cloud computing environment 240, such as data management, synchronization, or long-duration data transfers.

Virtualized storage 235-3 includes one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 provides hardware virtualization techniques that allow multiple operating systems (e.g., "guest operating systems") to execute concurrently on a host computer, such as computing resource 235. Hypervisor 235-4 may present a virtual operating platform to the guest operating systems, and may manage the execution of the guest operating systems. Multiple instances of a variety of operating systems may share virtualized hardware resources.

Network 250 includes one or more wired and/or wireless networks. For example, network 250 may include a cellular network (e.g., a fifth generation (5G) network, a fourth generation (4G) network, such as a long-term evolution (LTE) network, a third generation (3G) network, a code division multiple access (CDMA) network, another type of advanced generated network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of example environment 200 may perform one or more functions described as being performed by another set of devices of example environment 200.

Figure 3:
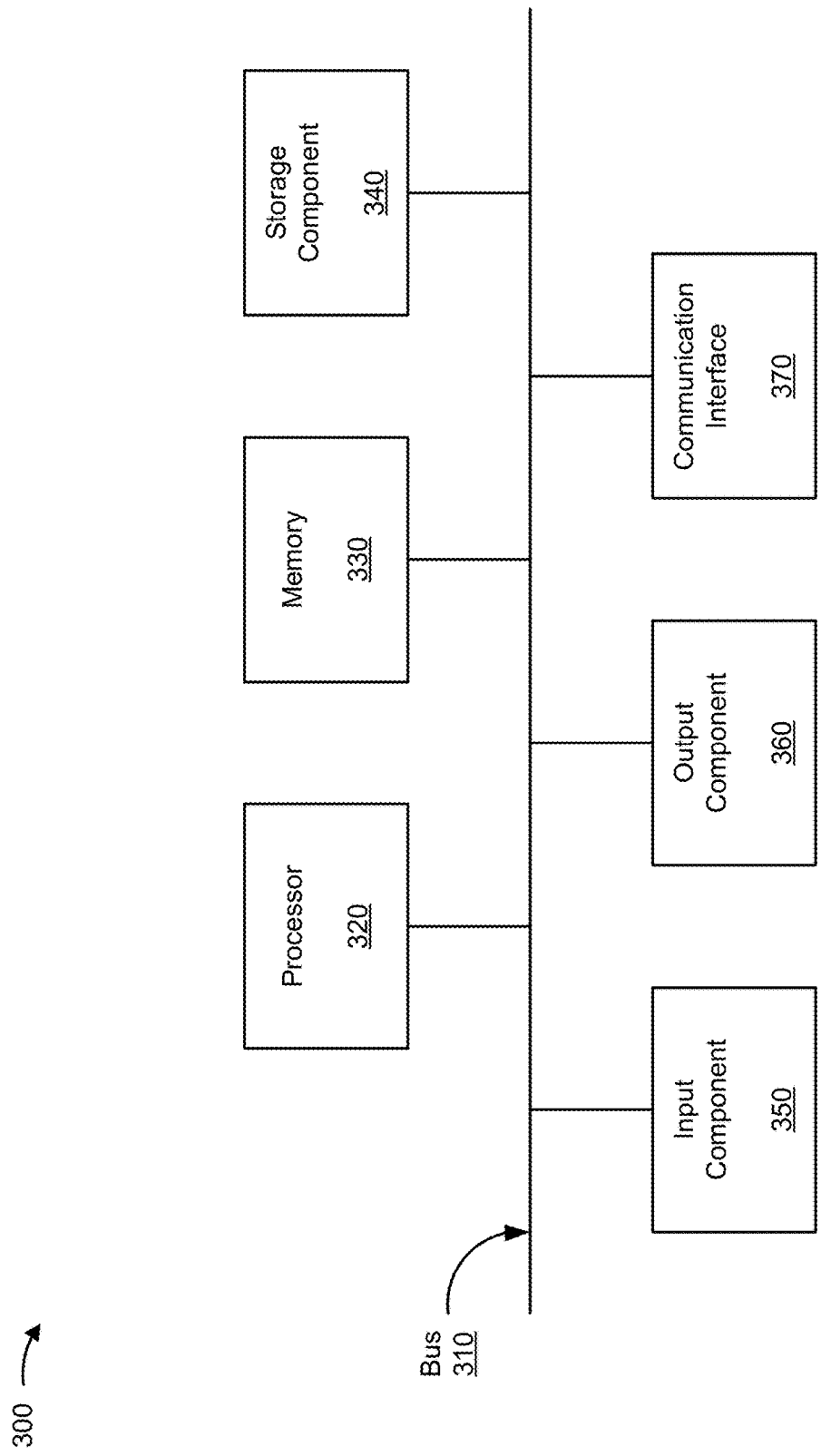
FIG. 3 is a diagram of example components of one or more devices of FIG. 2.

FIG. 3 is a diagram of example components of a device 300. Device 300 may correspond to user device 210, data source 220, and/or logistics management platform 230. In some implementations, user device 210, data source 220, and/or logistics management platform 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in location of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
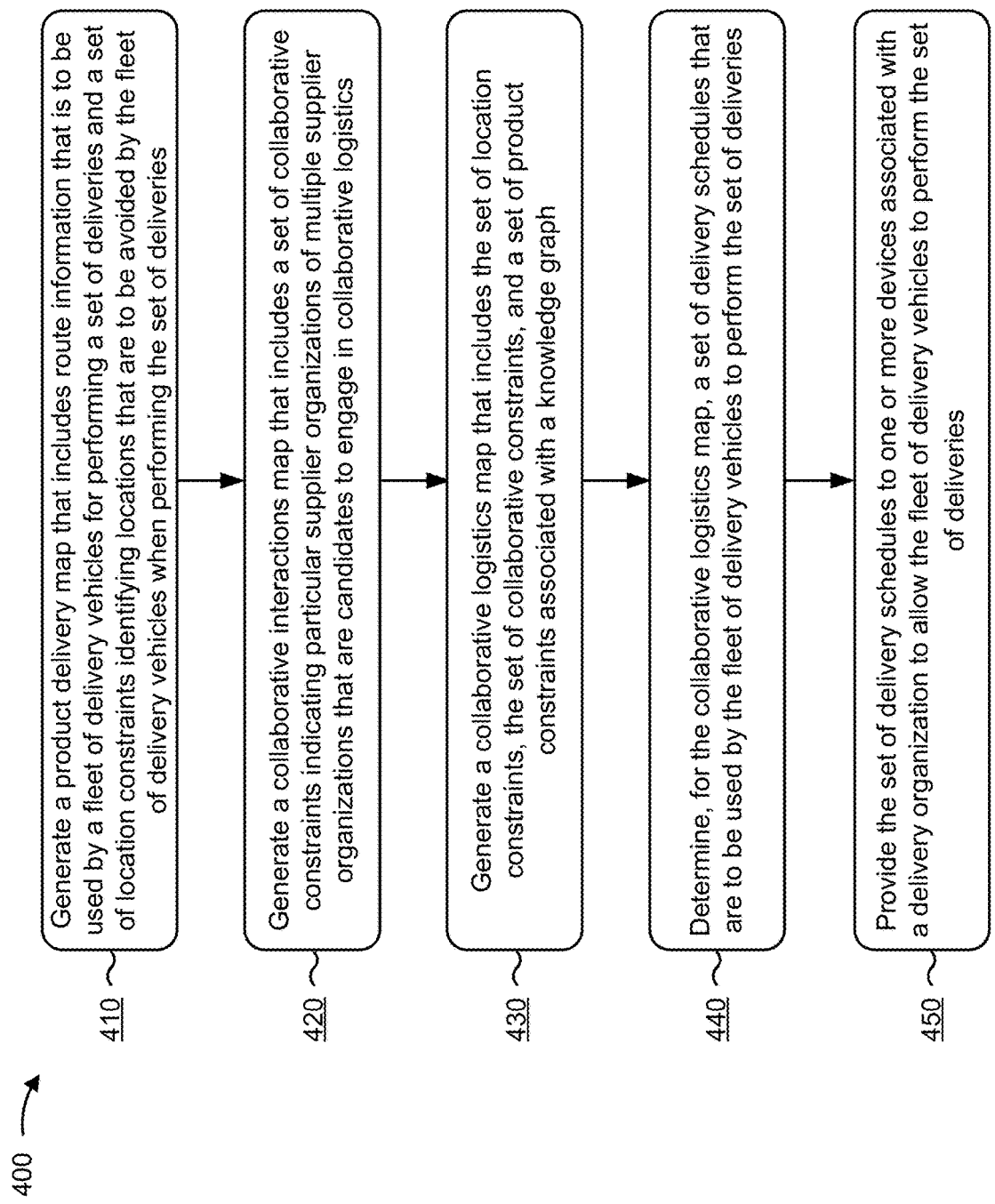
FIG. 4 is a flow chart of an example process for generating a collaborative logistics map that allows multiple supplier organizations to collaborate with a delivery organization, such that products of the multiple supplier organizations may be transported together to reduce transportation costs.

FIG. 4 is a flow chart of an example process 400 for generating a collaborative logistics map that allows multiple supplier organizations to collaborate with a delivery organization, such that products of the multiple supplier organizations may be transported together to reduce transportation costs. In some implementations, one or more process blocks of FIG. 4 may be performed by logistics management platform 230. In some implementations, one or more process blocks of FIG. 4 may be performed by another device or a group of devices separate from or including logistics management platform 230, such as user device 210 and/or data source 220.

As shown in FIG. 4, process 400 may include generating a product delivery map that includes route information that is to be used by a fleet of delivery vehicles for performing a set of deliveries and a set of location constraints identifying locations that are to be avoided by the fleet of delivery vehicles when performing the set of deliveries (block 410). For example, logistics management platform 230 (e.g., computing resource 225, processor 320, memory 330, storage component 340, etc.) may obtain product delivery information associated with a set of products and location information (e.g., geographic map information and/or real-time supplemental map information) associated with a geographic area in which the set of products are to be delivered, and may use the product delivery information and the location information to generate a product delivery map. The product delivery map may include a set of location constraints that identify events or incidents at particular locations that might inhibit or prevent a particular route from being used as an optimal route for delivery of a product to a destination location, such as a weather-related constraint, a traffic-related constraint, a construction-related constraint, and/or the like.

In some implementations, logistics management platform 230 may obtain product delivery information from a data source 220. For example, the data source 220 may store product delivery information for products associated with multiple supplier organizations. In this case, logistics management platform 230 may search (e.g., query) the product delivery information (e.g., in bulk, periodically over an interval, etc.). In some cases, logistics management platform 230 may obtain product delivery information for each supplier organization from separate data sources 220. The product delivery information may include, for each product provided by a supplier organization, a product name, a product pickup location, a product delivery location, a product delivery date, a product delivery time or time range, route information for a product that identifies a path from an origin location to a destination location, and/or the like.

In some implementations, logistics management platform 230 may obtain geographic map information from a data source 220. For example, the data source 220 may store geographic map information for a geographic area in which the set of products are to be delivered. In this case, logistics management platform 230 may obtain the geographic map information in the same manner described above (e.g., via a query). The geographic map information may include information relating to a road (e.g., sets of geographic coordinates identifying a length and/or width of a road, a quantity of lanes in the road, the direction or directions of travel permitted on the road, a speed limit of the road, data (e.g., shapes) identifying a road with a skewed shape, such as a flooded road, a non-flat flat, and/or the like, etc.), in addition to a man-made structure around the road (e.g., sets of geographic coordinates for a building, such as a store, a school, etc.), a natural structure around the road (e.g., sets of geographic coordinates identifying a body of water, a mountain, etc.), and/or the like.

In some implementations, logistics management platform 230 may obtain real-time supplemental map information from a group of data sources 220. For example, logistics management platform 230 may obtain real-time supplemental map information that includes information obtained from satellite images, information obtained from sensors affixed to delivery vehicles, information obtained from sensors associated with user devices in delivery vehicles, information obtained from sensors associated with non-delivery vehicles and/or user devices in non-delivery vehicles, information obtained from sensors located at particular geographic locations (e.g., a sensor at an intersection), and/or the like. The real-time supplemental map information may include weather information, information missing from the geographic map information, traffic information, delivery vehicle information, and/or the like.

As an example, logistics management platform 230 may obtain weather information. For example, logistics management platform 230 may obtain weather information from a webpage (e.g., using an application programming interface (API)), from a sensor affixed to a delivery vehicle, from a sensor located at a street intersection, and/or the like. In this case, the weather information may include a temperature, a forecast, an indication of a natural disaster, a flood warning, and/or the like.

As another example, logistics management platform 230 may obtain information missing from the geographic map information. For example, logistics management platform 230 may obtain information missing from the geographic map information from one or more satellites and/or a device that stores the information captured by the one or more satellites. In this case, the information missing from the geographic map information may include a new building, a new road, a new traffic, and/or the like.

As another example, logistics management platform 230 may obtain traffic information. For example, logistics management platform 230 may obtain traffic information from a device that stores real-time traffic information, from a sensor affixed to a delivery vehicle, from a sensor associated with a user device inside of a delivery vehicle, from a sensor located at a street intersection, and/or the like. In this case, the traffic information may include information indicating traffic congestion, a road block, construction, and/or the like.

As another example, logistics management platform 230 may obtain delivery vehicle information. For example, logistics management platform 230 may obtain delivery vehicle information from a sensor affixed to a delivery vehicle, from a device associated with a user device inside of a delivery vehicle, and/or the like. In this case, the delivery vehicle information may include information indicating a current location of a delivery vehicle, a status of a delivery vehicle, such as a status indicating an amount of fuel, an operating state, an occurrence of a maintenance light (e.g., which may light up when a problem relating to a particular delivery vehicle occurs), information relating to a current amount of storage capacity that the delivery vehicle has, and/or the like.

In some implementations, logistics management platform 230 may generate a product delivery map that includes a set of possible routes for delivering the set of products to the set of destinations. For example, logistics management platform 230 may generate a product delivery map that uses the product delivery information, the geographic map information, and the real-time supplemental map information to determine a set of possible routes for delivering the set of products to the set of destinations. Additionally, logistics management platform 230 may use the real-time supplemental map information to identify the set of location constraints within the product delivery map. In this way, when logistics management platform 230 determines delivery schedules (as described further herein), the delivery schedules include routes that avoid geographic locations identified by the set of location constraints.

In some implementations, logistics management platform 230 may determine a set of possible routes for the product delivery map using a neural network. For example, logistics management platform 230 may use a neural network to determine a set of possible routes that do not conflict with the set of location constraints. In this case, logistics management platform 230 may provide the product delivery information and location information as input to a neural network to cause the neural network to output a set of possible routes that do not conflict with the set of location constraints. In other cases, logistics management platform 230 may determine the set of possible routes using another type of path-finding technique.

In this way, logistics management platform 230 is able to generate a product delivery map.

As further shown in FIG. 4, process 400 may include generating a collaborative interactions map that includes a set of collaborative constraints indicating particular supplier organizations of multiple supplier organizations that are candidates to engage in collaborative logistics (block 420). For example, logistics management platform 230 (e.g., computing resource 225, processor 320, memory 330, storage component 340, etc.) may, using historical product delivery information and collaborative interactions information, generate a collaborative interactions map that includes a set of collaborative constraints that identify particular groups of supplier organizations that are candidates to engage in collaborative logistics.

In some implementations, logistics management platform 230 may obtain historical product delivery information from a data source 220. For example, the data source 220 may store historical product delivery information for each product provided by a supplier organization, such as a product name, a product destination, a product delivery date, a product delivery time or time range, route information identifying a path from an origin location to a destination location, and/or the like. In some cases, the route information may include preferred route information identifying a preferred path that a delivery vehicle delivering each product is likely to take. Additionally, logistics management platform 230 may obtain the historical product delivery information in the same manner described above (e.g., via a query).

In some implementations, logistics management platform 230 may obtain collaborative interactions information from a data source 220. For example, the data source 220 may store collaborative interactions information that may be used to determine if particular supplier organizations are candidates to engage in collaborative logistics with each other. The collaborative interactions information may include information identifying a particular delivery organization that is used by multiple supplier organizations, information identifying a preferred delivery organization of a particular supplier organization, information identifying delivery organizations that satisfy a threshold level of popularity, information identifying a delivery organization that is often used to deliver a particular type of good, information identifying delivery organizations within a particular geographic area, information identifying supplier organizations with budgets within a threshold range of each other, and/or the like. In this case, logistics management platform 230 may obtain the collaborative interactions information in the same manner described above (e.g., via a query).

In some implementations, logistics management platform 230 may identify collaborative interactions information using a natural language processing technique. For example, in some cases, only individual information about each supplier organization may be stored by data source 220. In this case, logistics management platform 230 may use a natural language processing technique to analyze data associated with each supplier organization to identify supplier organizations that use the same delivery organization, that deliver the same goods or the same type of goods, that identify the same delivery organization as a preferred delivery organization, that have origin locations (e.g., warehouses) within a threshold distance of each other, that have overlapping preferred routes, and/or the like. The natural language processing technique may include a parsing technique, a word segmentation technique, a lexical semantic technique, a named entity recognition (NER) technique, a lemmatization or stemming technique, an optical character recognition (OCR) technique, a sentiment analysis technique, and/or the like.

In some implementations, logistics management platform 230 may generate a collaborative interactions map. For example, logistics management platform 230 may use the historical product delivery information and the collaborative interactions information to generate a collaborative interactions map that includes the set of collaborative constraints. In this way, when logistics management platform 230 determines final product placement for the set of products and/or determines the set of routes to deliver the set of products (as each described further herein), the final product placement may only group products of supplier organizations into the same delivery vehicle if the supplier organizations are able to collaborate together, if the supplier organizations are able to collaborate with the same delivery organization, if the particular products being transported are able to be transported using the same delivery vehicle, and/or the like.

In some implementations, logistics management platform 230 may use machine learning to determine whether particular supplier organizations are candidates to engage in collaborative logistics. For example, logistics management platform 230 may train a machine learning model on historical information (e.g., historical product delivery information, historical collaborative interactions information, etc.), such that the machine learning model is able to be used to determine whether particular supplier organizations are candidates to engage in collaborative logistics.

In this way, logistics management platform 230 is able to generate a collaborative interactions map.

As further shown in FIG. 4, process 400 may include generating a collaborative logistics map that includes the set of location constraints, the set of collaborative constraints, and a set of product constraints associated with a knowledge graph (block 430). For example, logistics management platform 230 (e.g., computing resource 225, processor 320, memory 330, storage component 340, etc.) may obtain, from a data structure such as a knowledge graph, a set of product constraints associated with the set of products that are to be delivered by the fleet of vehicles. In this case, logistics management platform 230 may generate a collaborative logistics map that includes the set of location constraints, the set of collaborative constraints, and the set of product constraints.

In some implementations, logistics management platform 230 may access a knowledge graph. For example, logistics management platform 230 may access a knowledge graph that includes a set of nodes identifying product information for the set of products, such as a node identifying a product type (e.g., a television, a fruit, a chemical, etc.), a node identifying a product category (e.g., an electronic good, a food, etc.), a node identifying a product characterization (e.g., a hazardous product, a fragile product, a robust product, etc.), a product location (e.g., coordinates of a warehouse, coordinates of a store, etc.), a node identifying a delivery organization used to deliver a particular product, a node identifying a rule or a regulation associated with transportation of a particular product, such as a node identifying whether a first product and a second product have a constraint that prevents the two products from being transported together in a particular delivery vehicle (e.g., if a first product is a chemical and a second product is a food, etc.) or a node identifying a geographic area in which a particular product may not be transported (e.g., a chemical in a threshold distance of a school), and/or the like.

Additionally, the set of nodes in the knowledge graph may be connected via a set of edges that identify relationships between the nodes. For example, if a first node identifies a product name and a second node identifies a product location (e.g., coordinates of a particular warehouse), an edge may connect the first node and the second node to signify that the product is located in the particular warehouse. An example knowledge graph for a product is shown in FIG. 1C.

In some implementations, logistics management platform 230 may generate a collaborative logistics map. For example, logistics management platform 230 may generate a collaborative logistics map using the product delivery map that includes the set of location constraints, the collaborative interactions map that includes the set of collaborative constraints, and the knowledge graph that includes the set of product constraints. As such, logistics management platform 230 is able to generate a collaborative logistics map that is able to be used to determine delivery schedules, as described herein.

In some implementations, logistics management platform 230 may use the knowledge graph to perform inconsistency checks on the collaborative logistics map, thereby improving overall map accuracy. For example, logistics management platform 230 may generate an initial copy of the collaborative logistics map that includes the set of location constraints, the set of collaborative constraints, and the set of product constraints. In this case, logistics management platform 230 may perform an inconsistency check that cross-checks the set of product constraints of the knowledge graph against set of location constraints and/or the set of collaborative constraints.

As an example, logistics management platform 230 may generate a collaborative logistics map that, based on the set of location constraints, indicate that a first supplier organization and a second supplier organization are in optimal locations to engage in collaborative logistics with each other (e.g., there may not be any restrictive location constraints between them). In this example, logistics management platform 230 may perform an inconsistency check to determine that a product constraint for the first supplier organization is that products for the first supplier organization may not be shipped within a certain distance of a school (e.g., the first supplier organization may ship chemicals).

If the second organization has an optimal delivery that happens to travel within a certain distance of a school, then logistics management platform 230 may update the collaborative logistics map to identify that the first supplier organization and the second supplier organization have a location constraint as a result of supplier organization A being unable to transport goods within the certain distance of the school.

In this way, logistics management platform 230 is able to generate a collaborative logistics map.

As further shown in FIG. 4, process 400 may include determining, for the collaborative logistics map, a set of delivery schedules that are to be used by the fleet of delivery vehicles to perform the set of deliveries (block 440). For example, logistics management platform 230 (e.g., computing resource 225, processor 320, memory 330, storage component 340, etc.) may determine a set of delivery schedules that are to be used by the fleet of delivery vehicles to perform the set of deliveries. The set of delivery schedules may include final product placement for the set of products (e.g., which products are to be transported by which delivery vehicles) and a set of routes that are to be used by the fleet of delivery vehicles to perform the set of deliveries.

In some implementations, logistics management platform 230 may determine final product placement for the set of products. For example, logistics management platform 230 may determine final product placement for the set of products based on the set of location constraints, the set of collaborative constraints, and/or the set of product constraints. In this case, logistics management platform 230 may assign each product, of the set of products, to particular vehicles, of the fleet of vehicles, such that the assignment does not interfere with any of the constraints.

Additionally, or alternatively, logistics management platform 230 may determine specific locations within each delivery vehicle to place each product of the set of products. For example, if a particular delivery vehicle is delivering products to multiple destination locations, then logistics management platform 230 may determine specific locations within the particular delivery vehicle to load each of the products. As an example, if a product is going to a final delivery location, the product may be loaded to the back of the particular delivery, and if another product is going to an initial delivery location, the other product may be loaded to the front of the particular delivery vehicle.

In some implementations, logistics management platform 230 may determine the set of routes. For example, logistics management platform 230 may determine the set of routes based on the set of location constraints, the set of collaborative constraints, and/or the set of product constraints. In this case, logistics management platform 230 may determine the set of routes such that each route, of the set of routes, does not interfere with any of the constraints. Additionally, logistics management platform 230 may determine the set of routes using a path-finding technique, such as a shortest-possible path, (e.g., to improve delivery times), an economically preferred path (e.g., minimizing fuel expenses), and/or the like.

In some implementations, logistics management platform 230 may remove a route, of the set of routes, based on a product constraint. For example, in some cases, a product constraint may include a location constraint relating to a particular product, and logistics management platform 230 may only be able to determine whether one of the routes interferes with the product constraint after the set of routes have been determined. In this case, logistics management platform 230 may analyze each route based on the product constraint stored by the knowledge graph, and may determine that the route, of the set of routes, interferes with the product constraint. As such, logistics management platform 230 may remove the route, from the set of routes, based on determining that the route interferes with the product constraint.

As an example, the knowledge graph may include a rule or a regulation associated with transportation of a particular product or a particular type of product, such as a product constraint that a product containing toxic chemicals may not be transported within a threshold distance of a school. In this case, after first determining the set of routes, logistics management platform 230 may then determine whether each route, of the set of routes, is within a threshold range of a school and, if so, remove the route from the set of routes.

In this way, logistics management platform 230 is able to determine a final set of routes for delivering the set of products to the set of destinations.

As further shown in FIG. 4, process 400 may include providing the set of delivery schedules to one or more devices associated with a delivery organization to allow the fleet of delivery vehicles to perform the set of deliveries (block 450). For example, logistics management platform 230 (e.g., computing resource 235, processor 320, memory 330, storage component 340, communication interface 370, etc.) may provide the set of delivery schedules to one or more user devices 210 associated with a delivery organization that controls the fleet of delivery vehicles to allow the fleet of delivery vehicles to perform the set of deliveries. In this case, the one or more user devices 210 may include a device in a loading dock or warehouse, a device in or affixed to a delivery vehicle, a device in a retail store, and/or the like.

In some implementations, logistics management platform 230 may provide the collaborative map that includes the set of delivery schedules to user device 210. For example, logistics management platform 230 may provide the collaborative map for display on a user interface of user device 210. In some cases, such as when user device 210 is at a loading dock or warehouse, a user may view the final product placement to determine which goods to load into which delivery vehicles. In other cases, such as when user device 210 is located in or affixed to a delivery vehicle, a user may view and use the set of routes to perform the set of deliveries.

As an example, logistics management platform 230 may provide the set of delivery schedules for display on a user interface of a first user device 210. In this case, the first user device 210 may display final product placement to allow the set of products to be loaded into the fleet of delivery vehicles. Additionally, logistics management platform 230 may provide the set of delivery schedules for display on a user interface of a second user device 210. In this case, the second user device 210 may display the set of routes to allow the fleet of delivery vehicles to perform the set of deliveries.

Additionally, or alternatively, logistics management platform 230 may provide the collaborative logistics map that includes the set of delivery schedules to devices associated with one or more supplier organizations. For example, logistics management platform 230 may provide the collaborative logistics map to a supplier organization to update the supplier organization on the state of deliveries, on which delivery vehicles, routes, and/or collaborations have been selected, and/or the like.

Additionally, or alternatively, logistics management platform 230 may provide the information indicating the final product placement of the set of products to a robot to allow the robot to use the information to load the set of products into the fleet of vehicles. For example, logistics management platform 230 may provide the information indicating the final product placement to a robot located at a warehouse, a loading dock, a store, and/or the like. In this case, the robot may, using one or more processors, analyze the information indicating the final product placement to determine which products to load into which vehicles. Additionally, if a particular delivery vehicle is going to multiple destination locations, the robot may use the information indicating the final product placement to determine where in the particular delivery vehicle to load each good (e.g., if products are going to a final delivery location, the products may be loaded to the back of the particular delivery vehicle, if products are going to an initial delivery location, the products may be loaded to the front of the particular delivery vehicle). In this way, logistics management platform 230 is able to orchestrate an automated solution to loading goods involved in a collaborative logistics process.

Additionally, or alternatively, logistics management platform 230 may provide information indicating the set of routes to a vehicle capable of automatically traversing the set of routes to perform the set of deliveries. For example, logistics management platform 230 may provide information indicating a particular route, of the set of routes, to a vehicle capable of automatically performing deliveries, such as an autonomous vehicle, a drone, and/or the like. In this case, the autonomous vehicle, the drone, and/or the like, may, using one or more processors, analyze the information indicating the particular route to identify the particular route that is to be automatically traversed to perform the deliveries.

Additionally, or alternatively, logistics management platform 230 may provide updated route information to a delivery vehicle to allow the delivery vehicle to take a more efficient route. For example, logistics management platform 230 may continue to receive real-time supplemental map information while the fleet of delivery vehicles are performing the set of deliveries. In this case, assume the real-time supplemental map information identifies a traffic accident that causes a road block that would prevent a delivery vehicle from taking an assigned route. Here, logistics management platform 230 may determine an alternate route, and may provide the information indicating the alternate route to the delivery vehicle.

Additionally, or alternatively, logistics management platform 230 may provide updated route information to a delivery vehicle to ensure that a delivery deadline is met. For example, assume a first delivery vehicle is performing a first delivery to a particular destination. Further assume that the first delivery vehicle (or a device associated with the first delivery vehicle) is monitoring vehicle information in real-time, and detects that the delivery vehicle has a performance issue that may prevent timely execution of deliveries (e.g., a flat tire). In this case, the vehicle information may be provided to logistics management platform 230, and logistics management platform 230 may generate a routing solution that ensures that delivery deadlines for products stored within the first delivery vehicle are met. As an example, logistics management platform 230 may send a replacement delivery vehicle to pick up the goods, may send a towing or repair vehicle to replace the flat tire, may send another delivery vehicle that is nearby to deviate from deliveries to pick up goods that are at risk of missing a delivery deadline, and/or the like.

Additionally, or alternatively, logistics management platform 230 may obtain feedback information from devices associated with one or more supplier organizations. In this case, logistics management platform 230 may update the collaborative logistics map based on the feedback information. For example, a supplier organization may have a preference not to collaborative with another supplier organization, and, if the preference is not previously stored by the collaborative interactions information, then the supplier organization may provide feedback information to logistics management platform 230 to indicate the preference. As such, logistics management platform 230 may update the collaborative logistics map with the additional constraint. Similar feedback information may be provided with respect to location constraints and product constraints.

In some implementations, logistics management platform 230 may orchestrate billing the multiple supplier organizations for the transportation of the set of products. For example, logistics management platform 230 may provide billing information to devices associated with each supplier organization based on a distribution of goods allocated to the fleet of delivery vehicles and/or to a particular delivery vehicle. As an example, if two supplier organizations equally share space within a delivery vehicle, the two supplier organizations may split the transportation cost equally. Additionally, billing information may be determined based on one or more of an amount of space used within delivery vehicles, weight of goods within delivery vehicles, type of goods within each delivery vehicle (e.g., some goods may be transported at a premium price), a distance to the one or more destination locations, and/or the like. In this way, logistics management platform 230 is able to orchestrate billing of multiple supplier organizations that are engaging in collaborative logistics.

In this way, logistics management platform 230 is able to provide the collaborative logistics map to a device associated with a delivery organization to allow the fleet of delivery vehicles to perform the set of deliveries.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
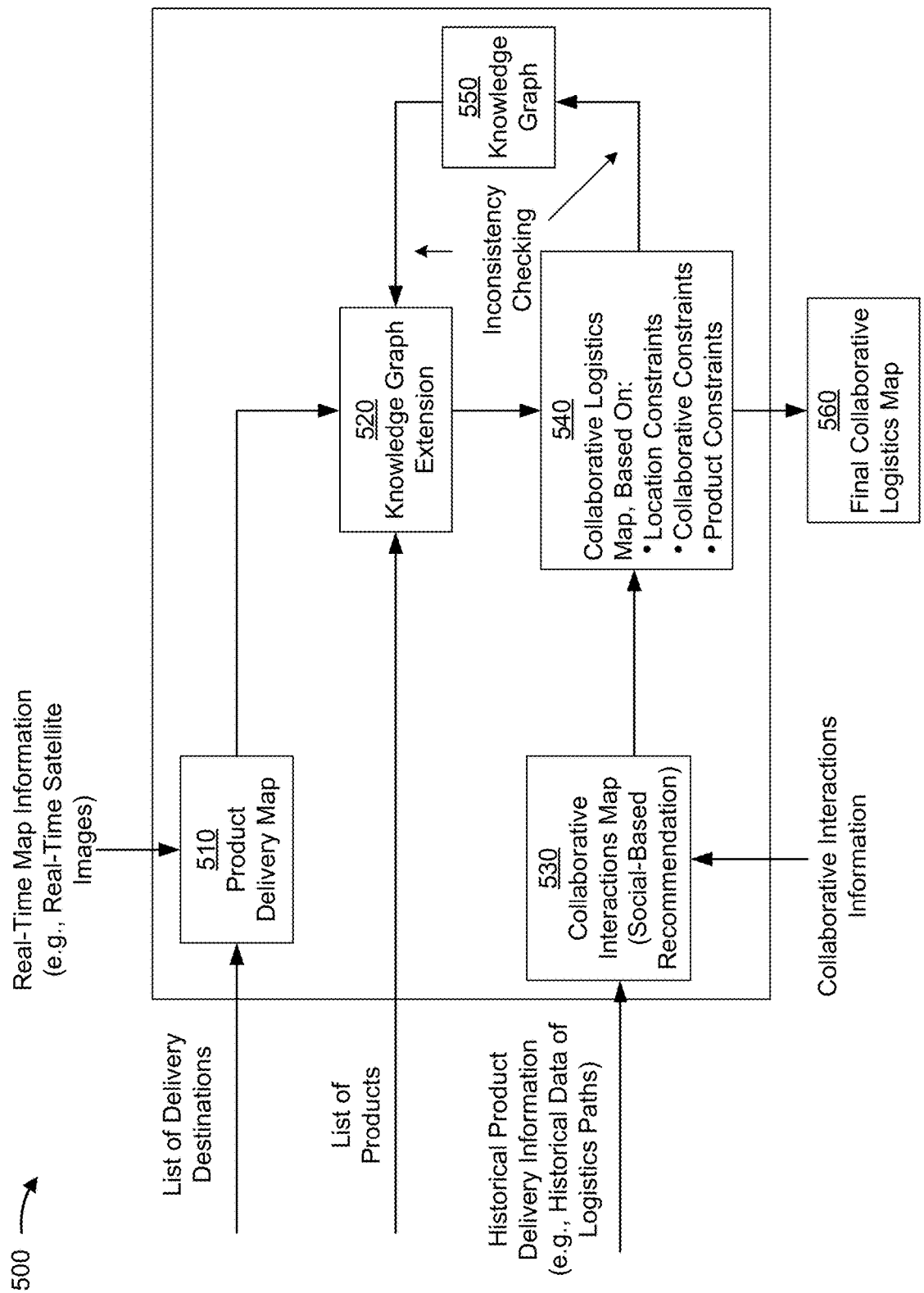
FIG. 5 is a diagram of an example implementation of the example process shown in FIG. 4.

FIG. 5 shows a diagram of an example implementation 500 of the example process described in FIG. 4.

As shown in FIG. 5, and by reference number 510, logistics management platform 230 may generate a product delivery map. For example, logistics management platform 230 may generate a product delivery map using product delivery information (e.g., a list of delivery destinations) and real-time map information (e.g., real-time satellite images), as defined elsewhere herein.

As shown by reference number 520, logistics management platform 230 may generate a knowledge graph extension. For example, a knowledge graph may include product information for a list of products associated with client's that are to use logistics management platform 230 for collaborative logistics, and logistics management platform 230 may generate a knowledge graph extension to combine the product information with the product delivery map.

As shown by reference number 530, logistics management platform 230 may generate a collaborative interactions map. For example, logistics management platform 230 may generate a collaborative interactions map using historical product delivery information (e.g., historical data of logistics paths) and collaborative interactions information, as defined elsewhere herein.

As shown by reference number 540, logistics management platform 230 may generate a collaborative logistics map. For example, logistics management platform 230 may generate a collaborative logistics map using the location constraints identified from the product delivery map, the collaborative constraints identified from the collaborative interactions map, and the product constraints identified from the extended knowledge graph.

As shown by reference number 550, logistics management platform 230 may use the knowledge graph to perform inconsistency checks on the collaborative logistics map, thereby improving overall map accuracy. For example, logistics management platform 230 may generate an initial copy of the collaborative logistics map that includes the set of location constraints, the set of collaborative constraints, and the set of product constraints. In this case, logistics management platform 230 may perform an inconsistency check that cross-checks the set of product constraints of the knowledge graph against set of location constraints and/or the set of collaborative constraints. In this way, and as shown by reference number 560, logistics management platform 230 is able to generate a final collaborative logistics map that eliminates inconsistencies between various constraints.

The number and arrangement of components shown in FIG. 5 are provided as an example. In practice, the example implementation 500 may include additional steps, fewer steps, steps components, or differently arranged steps than those shown in FIG. 5.

In this way, logistics management platform 230 allows the multiple supplier organizations to reduce transportation cost by scheduling efficient deliveries. Furthermore, logistics management platform 230 conserves processing resources by reducing a total number of deliveries that need to be processed, conserves processing resources relative to an inferior platform that is unable to generate delivery schedules in a manner that does not interfere with the constraints described above, conserves processing resources that might otherwise be used to generate new delivery schedules if an original delivery schedule includes routes that are unavailable, and/or the like.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, communicatively coupled to the one or more memories, to:
continuously obtain, via a network, real-time supplemental map information,
wherein the real-time supplemental map information includes at least one of:
real-time weather information, or
real-time traffic information;
generate, based on the real-time supplemental map information, a product delivery map,
the product delivery map including:
route information that is to be used by a fleet of delivery vehicles for performing a set of deliveries, and
a set of location constraints identifying locations that are to be avoided by the fleet of delivery vehicles when performing the set of deliveries,
wherein the set of deliveries are for delivering a set of products that are associated with a plurality of supplier organizations, and
wherein the fleet of delivery vehicles are associated with a delivery organization;
generate a collaborative interactions map that includes a set of collaborative constraints indicating particular supplier organizations of the plurality of supplier organizations that are candidates to engage in collaborative logistics,
wherein the one or more processors when, generating the collaborative interactions map, are to:
obtain historical product delivery information from a first data source,
obtain historical supplier organization information from a second data source,
identify collaborative interactions information between the particular supplier organizations based on the historical product delivery information and the historical supplier organization information using a natural language processing technique,
the collaborative interactions information including information about whether the particular supplier organizations are candidates to engage in collaborative logistics with each other, and
generate the collaborative interactions map based on the collaborative interactions information;
generate a collaborative logistics map,
the collaborative logistics map including:
the set of location constraints,
the set of collaborative constraints, and
a set of product constraints associated with a knowledge graph,
wherein the set of product constraints include one or more constraints that identify which products, of the set of products, are unable to be transported together in a particular delivery vehicle of the fleet of delivery vehicles;
determine, for the collaborative logistics map, a set of delivery schedules that are to be used to perform the set of deliveries,
wherein the set of delivery schedules are determined based on the set of location constraints, the set of collaborative constraints, and the set of product constraints;
provide the set of delivery schedules to one or more devices associated with the delivery organization to allow the fleet of delivery vehicles to perform the set of deliveries; and
provide, based on continuously obtaining the real-time supplemental map information, updated route information to one or more delivery vehicles of the fleet of delivery vehicles.

2. The device of claim 1,
wherein the real-time supplemental map information further includes:
construction information; and
wherein the set of location constraints includes at least one of:
one or more weather-related constraints,
one or more traffic-related constraints, or
one or more construction-related constraints.

3. The device of claim 1, wherein the one or more processors, when generating the product delivery map, are to:
generate, using a neural network, a set of possible routes that the fleet of delivery vehicles are capable of using to perform the set of deliveries,
wherein the set of possible routes do not interfere with the set of location constraints.

4. The device of claim 1, wherein the one or more processors are further to:
obtain, before generating the collaborative interactions map, the historical product delivery information associated with the plurality of supplier organizations,
wherein the historical product delivery information includes preferred route information identifying one or more routes that are most commonly taken by the fleet of delivery vehicles when performing the set of deliveries; and
wherein the one or more processors, when generating the collaborative interactions map, are to:
generate the collaborative interactions map that includes the set of collaborative constraints,
wherein the set of collaborative constraints are based on the preferred route information.

5. The device of claim 1,
wherein the collaborative interactions information is processed using the natural language processing technique and one or more of:
a machine learning technique, or
the knowledge graph.

6. The device of claim 1, wherein the one or more processors, when determining the set of delivery schedules, are to:
determine final product placement for the set of products based on the set of product constraints,
wherein final product placement includes assigning each product, of the set of products, to particular delivery vehicles, of the fleet of delivery vehicles, and
determine a set of routes to be traversed by the fleet of delivery vehicles,
wherein the set of routes do not interfere with the set of location constraints and the set of collaborative constraints.

7. The device of claim 6, wherein the one or more processors, when determining the set of routes, are to:
compare the set of routes to a product constraint of the set of product constraints included in the knowledge graph,
wherein the product constraint is a location constraint relating to particular products of the set of products,
determine that a route, of the set of routes, interferes with the product constraint of the set of product constraints, and
remove the route from the set of routes.

8. A method, comprising:
continuously obtaining, by a device and via a network, real-time supplemental map information,
wherein the real-time supplemental map information includes at least one of:
real-time weather information, or
real-time traffic information;
generating, by the device and based on the real-time supplemental map information, a product delivery map,
the product delivery map including:
route information that is to be used by a fleet of delivery vehicles for performing a set of deliveries, and
a set of location constraints identifying locations that are to be avoided by the fleet of delivery vehicles when performing the set of deliveries,
wherein the set of deliveries are for delivering a set of products that are associated with a plurality of supplier organizations, and
wherein the fleet of delivery vehicles are associated with a delivery organization;
generating, by the device, a collaborative interactions map that includes a set of collaborative constraints indicating particular supplier organizations of the plurality of supplier organizations that are candidates to engage in collaborative logistics,
where generating the collaborative interactions map comprises:
obtaining historical product delivery information from a first data source,
obtaining historical supplier organization information from a second data source,
identifying collaborative interactions information between the particular supplier organizations based on the historical product delivery information and the historical supplier organization information using a natural language processing technique, the collaborative interactions information including information about whether the particular supplier organizations are candidates to engage in collaborative logistics with each other, and generating the collaborative interactions map based on the collaborative interactions information;

generating, by the device, a collaborative logistics map, the collaborative logistics map including:

the set of location constraints, the set of collaborative constraints, and a set of product constraints associated with a data structure, wherein the set of product constraints include one or more constraints that identify which products, of the set of products, are unable to be transported together in a particular delivery vehicle of the fleet of delivery vehicles;

determining, by the device and for the collaborative logistics map, a set of delivery schedules that are to be used to perform the set of deliveries, wherein the set of delivery schedules are based on the set of location constraints and the set of product constraints;

providing, by the device, the set of delivery schedules to one or more devices associated with the delivery organization to allow the fleet of delivery vehicles to perform the set of deliveries; and providing, by the device and based on continuously obtaining the real-time supplemental map information, updated route information to one or more delivery vehicles of the fleet of delivery vehicles.

9. The method of claim 8, wherein the data structure is a knowledge graph.

10. The method of claim 8, wherein determining the set of delivery schedules comprises:

determining the set of delivery schedules based on the set of location constraints, the set of product constraints, and the set of collaborative constraints.

11. The method of claim 10, wherein the set of collaborative constraints are based on preferred route information identifying one or more routes that are most commonly taken by the fleet of delivery vehicles when performing the set of deliveries.

12. The method of claim 8, wherein the set of location constraints includes at least one of:

one of one or more weather-related constraints, one or more traffic-related constraints, or one or more construction-related constraints.

13. The method of claim 8, wherein determining the set of delivery schedules comprises:

determining final product placement for the set of products based on the set of location constraints and the set of product constraints, wherein the final product placement includes assigning each product, of the set of products, to particular delivery vehicles, of the fleet of delivery vehicles, and determining a set of routes to be traversed by the fleet of delivery vehicles, wherein the set of routes do not interfere with the set of location constraints and the set of product constraints.

14. The method of claim 8, further comprising:

comparing, after determining a set of routes as part of determining the set of delivery schedules, a product constraint, of the set of product constraints, to the set of routes, wherein the product constraint is a location constraint relating to particular products of the set of products, determining that a route, of the set of routes, interferes with the product constraint of the set of product constraints, and removing the route from the set of routes.

15. A non-transitory computer-readable medium storing instructions, the instructions comprising:

one or more instructions that, when executed by one or more processors, cause the one or more processors to:

continuously obtain, via a network, real-time supplemental map information, wherein the real-time supplemental map information includes at least one of:

real-time weather information, or real-time traffic information;

generate, based on the real-time supplemental map information, a product delivery map, the product delivery map including:

route information that is to be used by a fleet of delivery vehicles for performing a set of deliveries, and a set of location constraints identifying locations that are to be avoided by the fleet of delivery vehicles when performing the set of deliveries, wherein the set of deliveries are for delivering a set of products that are associated with a plurality of supplier organizations, and wherein the fleet of delivery vehicles are associated with a delivery organization;

generate a collaborative interactions map that includes a set of collaborative constraints indicating particular supplier organizations of the plurality of supplier organizations that are candidates to engage in collaborative logistics, wherein the one or more instructions, that cause the one or more processors to generate the collaborative interactions map, cause the processors to:

obtain historical product delivery information from a first data source, obtain historical supplier organization information from a second data source, identify collaborative interactions information between the particular supplier organizations based on the historical product delivery information and the historical supplier organization information using a natural language processing technique, the collaborative interactions information including information about whether the particular supplier organizations are candidates to engage in collaborative logistics with each other, and generate the collaborative interactions map based on the collaborative interactions information;

determine a set of delivery schedules that are to be used to perform the set of deliveries, wherein the set of delivery schedules are determined based on the set of location constraints and the set of collaborative constraints;

provide the set of delivery schedules to one or more devices associated with the delivery organization to allow the fleet of delivery vehicles to perform the set of deliveries; and provide, based on continuously obtaining the real-time supplemental map information, updated route information to one or more delivery vehicles of the fleet of delivery vehicles.

16. The non-transitory computer-readable medium of claim 15, wherein the one or more instructions, when executed by the one or more processors, further cause the one or more processors to:

generate, after generating the collaborative interactions map, a collaborative logistics map,
the collaborative logistics map including:
the set of location constraints,
the set of collaborative constraints, and
a set of product constraints associated with a knowledge graph,
wherein the set of product constraints include one or more constraints that identify which products, of the set of products, are unable to be transported together in a particular delivery vehicle of the fleet of delivery vehicles.

17. The non-transitory computer-readable medium of claim 15, wherein the one or more instructions, that cause the one or more processors to generate the product delivery map, cause the one or more processors to:

generate, using a neural network, a set of possible routes that the fleet of delivery vehicles are capable of using to perform the set of deliveries,
wherein the set of possible routes do not interfere with the set of location constraints.

18. The non-transitory computer-readable medium of claim 15, wherein the one or more instructions, when executed by the one or more processors to, further cause the one or more processors to:

obtain, before generating the collaborative interactions map, the historical product delivery information associated with the plurality of supplier organizations,
wherein the historical product delivery information includes preferred route information identifying one or more routes that are most commonly taken by the fleet of delivery vehicles when performing the set of deliveries; and wherein the one or more processors, when generating the collaborative interactions map, are to:
generate the collaborative interactions map that includes the set of collaborative constraints,
wherein the set of collaborative constraints are based on the preferred route information.

19. The non-transitory computer-readable medium of claim 15, wherein the one or more instructions, that cause the one or more processors to determine the set of delivery schedules, cause the one or more processors to:

determine final product placement for the set of products based on the set of location constraints and the set of collaborative constraints,
wherein the final product placement includes assigning each product, of the set of products, to particular delivery vehicles, of the fleet of delivery vehicles, and determine a set of routes to be traversed by the fleet of delivery vehicles,
wherein the set of routes do not interfere with the set of location constraints and the set of collaborative constraints.

20. The non-transitory computer-readable medium of claim 15, wherein the one or more instructions, that cause the one or more processors to provide the set of delivery schedules to the one or more devices associated with the delivery organization, cause the one or more processors to:

provide the set of delivery schedules for display on a user interface of a first device of the one or more devices,
wherein the user interface of the first device is to display final product placement to allow the set of products to be loaded into the fleet of delivery vehicles, and provide the set of delivery schedules for display on a user interface of a second device of the one or more devices,
wherein the user interface of the second device is to display a set of routes that are part of the set of delivery schedules to allow the fleet of delivery vehicles to perform the set of deliveries.

* * * * *